United States Patent Office 3,140,264
Patented July 7, 1964

3,140,264
REJUVENATION OF SPENT SUPPORTED
PLATINUM CATALYST
Stephen M. Oleck, Moorestown, and Stephen J. Wantuck,
West Collingswood, N.J., assignors to Socony Mobil
Oil Company, Inc., a corporation of New York
No Drawing. Filed Aug. 25, 1960, Ser. No. 51,804
3 Claims. (Cl. 252—412)

This invention relates to a method for rejuvenating a spent supported platinum catalyst. More particularly, the present invention is concerned with a method for rejuvenating a spent supported platinum catalyst by subjecting the same to a specified treatment with hydrogen prior to the deposition thereon of additional platinum metal.

Catalysts containing small amounts of platinum generally distributed over a porous oxide support such as alumina or silica-alumina composites are widely employed in hydrocarbon conversion processes such as, for example, reforming, isomerization and hydrocracking of petroleum hydrocarbons. In such processes, the platinum-containing catalyst gradually loses activity due to the deposition thereon of carbonaceous deposits and changes in the platinum structure. Treating the catalysts at elevated temperatures in an oxygen-containing atmosphere removes the carbonaceous deposits and during initial periods of use generally restores activity to a satisfactory level. However, since the changes in platinum structure taking place are permanent, continued operation eventually decreases the dehydrogenation activity of the catalyst attributable to the presence therein of platinum to a level which is ineffective for the intended catalytic reaction. It has heretofore been customary when such level is reached to replace the spent platinum-containing catalyst with fresh catalyst. However, as will be realized, the above designated catalysts are expensive, not only because of the platinum which they contain, but also because of the relatively high cost involved in manufacture of these catalysts. Thus, it is highly advantageous to extend the life of the subject catalyst and to thus prolong its period of usefulness in catalytically effecting the desired conversion of hydrocarbons therewith.

In accordance with the invention described herein a method has been discovered for rejuvenating spent hydrocarbon conversion catalysts consisting essentially of platinum deposited on a porous solid support. Thus, in one embodiment, the present invention comprises a method for rejuvenating a spent platinum supported catalyst initially containing about 0.35 to about 1 weight percent platinum deposited on a solid porous support and which has been employed in a hydrocarbon conversion operation, by burning carbonaceous deposit from the spent catalyst in an oxygen-containing gas at an elevated temperature, purging the catalyst free of said oxygen-containing gas, treating the catalyst with hydrogen at a temperature in the approximate range of 500 to 1100° F. for 1 to 24 hours, cooling the catalyst to below the boiling point of the platinum compound impregnating solution employed, contacting the cooled catalyst with said impregnating solution of sufficient platinum compound concentration to deposit at least 0.2 weight percent platinum (dry basis) on the catalyst, drying the catalyst by passing a heated gas therethrough and reheating to the hydrocarbon conversion reaction temperature.

In another embodiment, the invention provides a method for rejuvenation of a spent particle-form platinum reforming catalyst of 0.35 to 0.6 weight percent platinum deposited on alumina in place in the commercial reforming reactor by burning carbonaceous deposit from the spent catalyst in an oxygen-containing gas at an elevated temperature, purging the catalyst free of oxygen-containing gas, treating the catalyst with hydrogen at a temperature in the approximate range of 500 to 1100° F. for 1 to 24 hours, cooling the catalyst by circulating a cooling gas therethrough to below the boiling point of chloroplatinic acid, contacting the cooled catalyst particles with a solution of chloroplatinic acid solution of sufficient concentration to deposit 0.35 to 0.6 weight percent platinum (dry basis) on the catalyst, drying the catalyst particles by passing a heated gas therethrough and reheating to the reforming reaction temperature.

In still another embodiment, the invention affords a method for rejuvenation of a spent supported platinum hydrocarbon conversion catalyst which has undergone a decrease in dehydrogenation activity as a result of use in hydrocarbon conversion operation by freeing the surface of carbonaceous deposit laid down during the hydrocarbon conversion operation, purging the catalyst free of the oxygen containing gas, treating the catalyst with hydrogen at a temperature in the approximate range of 500 to 1100° F. for 1 to 24 hours, evacuating the catalyst to a reduced pressure, impregnating the catalyst maintained under reduced pressure with a solution of a platinum compound of concentration sufficient to deposit on the spent catalyst, additional platinum in an amount of at least 0.2 weight percent and, thereafter, heating the resulting composite to the temperature at which the aforesaid hydrocarbon conversion is carried out.

The method described herein is contemplated as being suitable for rejuvenating platinum supported catalyst which undergo a decrease in dehydrogenation activity upon use in catalyzing hydrocarbon conversion. Typical reactions wherein platinum deposited on a porous oxide support have been used include reforming, isomerization, hydrocracking and aromatization of various hydrocarbons and hydrocarbon mixtures. These reactions are carried out at an elevated temperature generally in the approximate range of 400° F. to 1000° F. under conditions well known in the art. Thus, reforming is ordinarily effected at a temperature between about 700° F. and about 1000° F.; hydrocracking employs a temperature generally in the range of 400° F. to 900° F. and isomerization utilizing the catalysts in question is usually carried out at a temperature between 600° F. and 1000° F.

The porous oxide support upon which platinum is deposited is generally an aluminous or siliceous porous solid. Thus, typical supports which have been used for these catalysts include alumina, silica and silica-alumina composites as well as composites of silica with zirconia, magnesia, thoria, titania, hafnia and beryllia.

The amount of platinum deposited on these supports has varied widely. The catalysts undergoing treatment in accordance with the present invention generally contain an initial platinum content within the range of 0.35 to 1 percent by weight. Thus, a typical commercial reforming catalyst having a platinum content of between about 0.35 and about 0.6 weight percent was found to be effectively rejuvenated, in accordance with the present method.

During use of the aforesaid catalysts in effecting hydrocarbon conversion, a carbonaceous deposit commonly referred to as "coke" is laid down on the catalyst surface which tends to interfere with the activity of the catalyst and which, in accordance with conventional procedure is periodically removed from the catalyst by burning in a combustion-supporting atmosphere such as air or other oxygen-containing gas at an elevated temperature. It is essential to the success of the present method of rejuvenation that the catalyst be substantially free of such carbonaceous deposit before undergoing treatment with the platinum compound impregnating solution. It is also essential, as will be evident from the data hereinafter set forth, that the spent platinum catalyst undergo treatment with hydrogen prior to platinum addition since it has been established that improvement in dehydrogenation activity of the resultant catalyst due to the additional platinum is substantially greater when the same is subjected to a hydrogen pretreatment than when such hydrogen pretreatment was absent.

Rejuvenation is, accordingly, accomplished by contacting the spent supported platinum catalyst, substantially free of carbonaceous deposit, with hydrogen at a temperature in the approximate range of 500 to 1100° F. for 1 to 24 hours. The catalyst, after such treatment, is cooled and contacted with a solution of a platinum compound of concentration sufficient to deposit on the spent catalyst additional platinum in an amount of at least 0.2 weight percent. The catalyst thereafter is drained of excess solution, if any, and dried and calcined in an atmosphere which does not adversely affect the catalyst such as, for example, air or hydrogen generally at a temperature in the range of 400° F. to 1200° F. As a practical matter, the calcination step will, generally, involve reheating the rejuvenated catalyst to the temperature at which the hydrocarbon conversion reaction employing such catalyst is carried out. After removing carbonaceous deposit from the spent catalyst by treatment with an oxygen-containing gas, the same is purged free of the oxygen-containing gas and subjected to treatment with hydrogen. In such latter step, the catalyst is maintained in contact with hydrogen at an elevated temperature generally within the range of about 500 to about 1100° F. and, preferably, in the approximate range of 800 to 1000° F. for a period of 1 to 24 hours. After such hydrogen treatment the catalyst is cooled to below the boiling point of the platinum compound impregnating solution subsequently employed. The catalyst is thereafter contacted with the platinum compound impregnating solution, preferably under conditions which permit the impregnating solution to disperse uniformly throughout the catalyst. The catalyst is subsequently dried and then calcined, preferably at a temperature of between about 800° F. and 1000° F.

The amount of additional platinum deposited on the spent catalyst will, generally, not exceed about 1 percent. A particularly effective amount of added platinum has been found to be that approximately equal to the platinum content of the initial catalyst, i.e. within the range of about 0.35 to 1 percent by weight. Thus, for a typical reforming catalyst of platinum on alumina, the amount of added platinum is within the approximate range of 0.35 to 0.6 weight percent. It is contemplated that the rejuvenation procedure described herein may be applied to the same catalyst batch a number of times, generally until the point is reached where it is considered desirable for investment purposes to recover the platinum from the catalyst.

As impregnating solutions, generally an aqueous solution of chloroplatinic acid will be employed. It is within the purview of the invention, however, to utilize solutions in which solvents other than water are present such as alcoholic solutions, etc. Also, as will be realized, platinum compounds other than chloroplatinic acid may be employed such as for example, ammonium platinum chloride, trimethylbenzyl ammonium platinum chloride, tetramino platino chloride, ammonium platino nitrate, and other platinum compounds which have heretofore been used in initial preparation of the platinum supported catalyst.

A particularly effective method for accomplishing impregnation of the spent catalyst entails evacuating the same after removal therefrom of carbonaceous deposit and pretreatment with hydrogen under the above-specified conditions of time and temperature, to a pressure within the range of about 4 to about 400 mm. of mercury and contacting the catalyst maintained under such reduced pressure with the platinum compound impregnating solution of concentration sufficient to deposit on the spent catalyst additional platinum in the amount of at least 0.2 weight percent.

It is a preferred embodiment of the invention to rejuvenate the spent supported platinum catalyst in place in the reactor vessel in which the hydrocarbon conversion reaction is accomplished. Thus, it is customary practice to utilize the catalyst in the form of particles in a bed situated in a suitable reactor wherein contact is made with the hydrocarbon charge under catalytic conversion conditions. Following the teachings of this invention, the bed of catalyst particles having a reduced dehydrogenating activity as a result of employment in effecting catalytic conversion of the hydrocarbon charge at elevated temperature under conditions such that a carbonaceous deposit is laid down on the catalyst is subjected to the steps of burning the carbonaceous deposit from the spent catalyst particles in an oxygen-containing gas, purging the catalyst free of oxygen-containing gas either by evacuating the catalyst bed or by sweeping the same with a gas which does not contain free oxygen such as, for example, carbon dioxide, nitrogen or hydrogen. The catalyst is thereafter subjected to treatment with and maintained in an atmosphere of hydrogen at a temperature in the approximate range of 500 to 1100° F. for a period of 1 to 24 hours. The catalyst is thereafter cooled by circulating therethrough a cooling gas such as flue gas, nitrogen, air or other gas which does not adversely affect the catalyst to reduce the temperature of the catalyst bed to below the temperature of the platinum compound impregnating solution subsequently used. Thereafter, the catalyst bed is contacted, suitably by spraying, with the impregnating solution of requisite concentration to deposit at least 0.2 weight percent additional platinum thereon. Any excess solution is drained from the catalyst bed and recovered for future use. The catalyst bed is then dried and reheated in the usual manner to the temperature at which the hydrocarbon conversion reaction is carried out.

The test utilized herein to determine dehydrogenation activity of the spent rejuvenated catalysts involves determination of the amount of benzene produced from cyclohexane under carefully controlled conditions. One cc. of material, of which 5.5 milligrams is the catalyst sample and 0.6 cc. is Vycor or ground glass is utilized in the test. Both the catalyst sample and the inert material are ground to 100–150 mesh particle size and thoroughly mixed before being charged to the reactor. The reactor is then placed in a furnace and the unit is purged with nitrogen, then filled with hydrogen at 750° F. and 350 p.s.i.g. pressure. The hydrogen rate is held at 2.24 liters per minute and pure cyclohexane is charged at 100 cc. per hour for 20 minutes. The liquid product in the first five minutes is discarded and material made during the last 15 minutes is analyzed by mass spectrometry for benzene. The mol percent benzene realized is compared with the mol percent benzene obtained from a run on a standard catalyst (a fresh commercial reforming catalyst containing 0.6 weight percent platinum deposited on alumina) and the result is reported as percent of the standard.

The following examples will serve to illustrate the method of the invention without limiting the same:

EXAMPLE 1

A platinum on alumina catalyst having a surface area of 115 m.²/gram and containing 0.6 weight percent platinum was employed in a reforming unit under commercial reforming conditions utilizing a naphtha charge having a boiling range of 180 to 380° F. and employing a temperature of 950° F., a pressure of 500 p.s.i.g. and a liquid hourly space velocity of 1. At the end of 19 months under these conditions, the dehydrogenation activity of the catalyst, determined as described hereinabove, had declined from an initial value of 100 to 7. The catalyst was heated in an oxygen-containing atmosphere at a temperature of about 850° F. to remove carbonaceous deposit.

Five hundred (500) grams of the spent catalyst were treated for 6 hours at 925° F. in a stream of hydrogen flowing at the rate of 2 volumes of hydrogen per volume of catalyst per minute. Two hundred (200) grams of the above hydrogen treated catalyst were evacuated to a pressure of 5 mm. of mercury. The vacuum was broken by introduction of gaseous carbon dioxide. The catalyst sample was evacuated once again and 92 cc. of chloroplatinic acid solution (containing 0.70 gram platinum) were contacted with the catalyst. The volume of solution was just sufficient to fill the catalyst pores and the concentration of solution was sufficient to deposit 0.35 weight percent platinum on the catalyst. The catalyst particles and chloroplatinic acid solution were agitated to insure uniform contact. The vacuum was then broken and the catalyst was permitted to stand over 24 hours, after which it was dried in flowing air at a temperature of 240° F. The catalyst was thereafter calcined to a temperature of 850° F. in a stream of dry air flowing at a rate of 5 volumes of air per volume of catalyst per minute. The resulting catalyst was found to have a dehydrogenation activity of 88.

The rejuvenated catalyst was tested for reforming a Mid-Continent naphtha boiling in the range of 180 to 380° F. at 500 p.s.i.g., 10/1 recycle hydrogen to hydrocarbon mol ratio, liquid hourly space velocity of 2 and at an inlet temperature of 920° F. The reformate obtained after 15 hours of such operation (leaded with 3 ml. TEL) had an octane rating of 97.7. Fresh catalyst containing 0.35 weight percent platinum deposited on alumina afforded reformate having an octane rating of about 98 under the same conditions of reforming.

EXAMPLE 2

Two hundred (200) grams of the hydrogen treated spent catalyst of Example 1 were impregnated in accordance with the technique described in such example but employing, as the impregnating solution, 92 cc. of chloroplatinic acid solution containing 1.21 grams platinum which served to deposit 0.6 weight percent platinum on the catalyst. The catalyst was thereafter treated, as in Example 1, and, upon testing, was found to have a dehydrogenation activity of 104.

EXAMPLE 3

One hundred twenty-one (121) grams of the hydrogen treated spent catalyst of Example 1 were impregnated in accordance with the technique described in such example but employing, as the impregnating solution, 57 cc. of chloroplatinic acid solution containing 0.42 gram platinum which served to deposit 0.35 weight percent platinum on the catalyst. The catalyst was thereafter treated as in Example 1 and, upon testing, was found to have a dehydrogenation activity of 92.

In the following comparative example the step of pretreatment of the spent platinum-alumina catalyst with hydrogen was omitted.

EXAMPLE 4

One hundred seventy-six (176) grams of the spent catalyst described in Example 1, freed of carbonaceous deposit, were evacuated to a pressure of 5 mm. of mercury. The vacuum was broken by introduction of gaseous carbon dioxide. The catalyst sample was evacuated once again and 74 cc. of chloroplatinic acid solution (containing 0.62 gram platinum) were contacted with the catalyst. The volume of solution was just sufficient to fill the catalyst pores and the concentration of solution was sufficient to deposit 0.35 weight percent platinum on the catalyst. The catalyst particles and chloroplatinic acid solution were agitated to insure uniform contact. The vacuum was then broken and the catalyst was permitted to stand for about 24 hours, after which it was dried in flowing air at a temperature of 240° F. The catalyst was thereafter calcined to a temperature of 850° F. in a stream of dry air flowing at a rate of 5 volumes of air per volume of catalyst per minute. The resulting catalyst, upon testing, was found to have a dehydrogenation activity of only 15.

A summary of the results obtained with the catalysts of the above examples is set forth in the table below:

Table I

| Example | Hydrogen Pretreat | Weight of Catalyst Impregnated, Grams | Vol. of $H_2PtCl_6$ Solution, cc. | Platinum Added | | Dehydrogenation Activity |
|---|---|---|---|---|---|---|
| | | | | Wt. in $H_2PtCl_6$ Solution, Grams | Wt. Percent of Catalyst | |
| | No | 0.0 | 0 | 0.0 | 0.0 | 7 |
| 1 | Yes | 200 | 92 | 0.70 | 0.35 | 88 |
| 2 | Yes | 200 | 92 | 1.21 | 0.6 | 104 |
| 3 | Yes | 121 | 57 | 0.42 | 0.35 | 92 |
| 4 | No | 176 | 74 | 0.61 | 0.35 | 15 |

It will be seen from the foregoing data that hydrogen pretreatment of the spent platinum alumina reforming catalyst prior to platinum addition resulted in a marked improvement in restoration of the dehydrogenation activity thereof.

EXAMPLE 5

A platinum on alumina catalyst having a surface area of 130 m.²/g. and containing 0.6 weight percent platinum was employed in a reforming unit under commercial reforming conditions utilizing a charge stock of Mid-Continent naphtha having a boiling range of 180 to 380° F. and employing a temperature of about 950° F., a pressure of 500 p.s.i.g. and a liquid hourly spaced velocity of 1. At the end of about 38 months under these conditions, the dehydrogenation activity of the catalyst determined as described hereinabove had declined from an initial value of 100 to 33. The catalyst was heated in an oxygen-containing atmosphere at a temperature of about 850° F. to remove carbonaceous deposit.

500 grams of the spent catalyst were treated for 6 hours at 925° F. in a stream of hydrogen flowing at the rate of 2 volumes of hydrogen per volume of catalyst per minute. One hundred ninety-four (194) grams of the above hydrogen-treated catalyst were evacuated to a pressure of 5 mm. of mercury. The vacuum was broken by introduction of gaseous carbon dioxide. The catalyst sample was evacuated once again and 102 cc. of chloroplatinic acid solution containing 0.68 gram platinum were contacted with the catalyst. The volume of solution was just sufficient to fill the catalyst pores and the concentration of solution was sufficient to deposit 0.35 weight percent platinum on the catalyst. The catalyst particles and chloroplatinic acid solution were agitated to insure uniform contact. The vacuum was then broken and the catalyst was permitted to stand 24 hours, after which it was dried in flowing air at a temperature of 240° F. and then calcined at 850° F. in a stream of dry air, flowing at a rate of 5 volumes of air per volume of catalyst per minute. The resulting catalyst was found to have a dehydrogenation activity of 109.

EXAMPLE 6

One hundred sixty-six (166) grams of the hydrogen treated spent catalyst of Example 5 were impregnated in accordance with the technique described in such example but employing as the impregnating solution 84 cc. of chloroplatinic acid solution containing 0.32 gram platinum which served to deposit 0.2 weight percent platinum on the catalyst. The catalyst was thereafter treated as in Example 5 and upon testing, was found to have a dehydrogenation activity of 75.

EXAMPLE 7

Two hundred (200) grams of the spent catalyst described in Example 5 freed of carbonaceous deposit but not pretreated with hydrogen were evacuated to a pressure of 5 mm. of mercury. The vacuum was broken by introduction of gaseous carbon dioxide. The catalyst sample was evacuated once again and 94 cc. of chloroplatinic acid solution (containing 0.40 gram platinum) were contacted with the catalyst. The volume of solution was just sufficient to fill the catalyst pores and the concentration of solution was sufficient to deposit 0.2 weight percent platinum on the catalyst. The catalyst particles and chloroplatinic acid solution were agitated to insure uniform contact. The vacuum was then broken and the catalyst was permitted to stand for about 24 hours after which it was dried at about 240° F. The catalyst was thereafter calcined to a temperature of 850° F. in a stream of dry air flowing at a rate of 5 volumes of air per volume of catalyst per minute. The resulting catalyst was found to have a dehydrogenation activity of only 50.

A summary of the results obtained with the above Examples 5–7 is set forth in the table below:

*Table II*

| Example | Hydrogen Pretreat | Weight of Catalyst Impregnated, Grams | Vol. of $H_2PtCl_6$ Solution, cc. | Platinum Added | | Dehydrogenation Activity |
|---|---|---|---|---|---|---|
| | | | | Wt. in $H_2PtCl_6$ Solution, Grams | Wt. Percent of Catalyst | |
| | No | 0.0 | 0 | 0.0 | 0.0 | 33 |
| 5 | Yes | 194 | 102 | 0.68 | 0.35 | 109 |
| 6 | Yes | 166 | 84 | 0.32 | 0.2 | 75 |
| 7 | No | 200 | 94 | 0.40 | 0.2 | 50 |

The above data again point up the advantage of treating the spent supported platinum catalyst with hydrogen prior to platinum addition. The improvement in dehydrogenation activity due to the added platinum, as will be evident, is substantially greater when the catalyst is initially subjected to hydrogen pretreatment than when such hydrogen pretreatment was absent.

It is accordingly to be understood that the above description is merely illustrative of preferred embodiments of the invention of which may variations may be made by those skilled in the art without departing from the spirit thereof.

We claim:

1. A method for rejuvenating a spent particle-form platinum catalyst containing platinum deposited on a porous support in place in the reactor vessel without effecting removal of platinum therefrom wherein hydrocarbon conversion utilizing said catalyst is accomplished which comprises burning carbonaceous deposit from the surface of said catalyst laid down during said hydrocarbon conversion, treating the catalyst with hydrogen at a temperature in the approximate range of 500 to 1100° F. for 1 to 24 hours, circulating a cooling gas through the catalyst bed to reduce the temperature thereof to below the boiling point of the platinum compound impregnating solution subsequently employed, contacting the cooled catalyst particles with said impregnating solution of sufficient concentration to deposit thereon additional platinum in an amount of at least 0.2 weight percent, drying and reheating the resulting composite to the temperature at which said hydrocarbon conversion is effected.

2. A method for rejuvenating a spent particle-form platinum reforming catalyst containing platinum deposited on a porous oxide support in place in a reforming reactor without effecting removal of platinum therefrom which comprises burning carbonaceous deposit from the surface of said catalyst laid down during reforming, treating the catalyst with hydrogen at a temperature in the approximate range of 500 to 1100° F. for 1 to 24 hours, circulating a cooling gas through the catalyst bed to reduce the temperature thereof to below the boiling point of the platinum compound impregnating solution subsequently employed, contacting the cooled catalyst particles with said impregnating solution of sufficient concentration to deposit thereon additional platinum in an amount of at least 0.2 weight percent, drying and reheating the resulting composite to reforming temperature.

3. A method for rejuvenating a spent particle-form platinum reforming catalyst containing 0.35 to 1 weight percent platinum deposited on an alumina support in place in a commercial reforming reactor without effecting removal of platinum therefrom which comprises burning carbonaceous deposit from the surface of said catalyst laid down during reforming in an oxygen-containing gas at an elevated temperature, purging the catalyst bed free of said oxygen-containing gas, treating the catalyst with hydrogen at a temperature in the approximate range of 500 to 1100° F. for 1 to 24 hours, circulating a cooling gas through the catalyst bed to reduce the temperature thereof to below the boiling point of the platinum compound impregnating solution subsequently employed, contacting the cooled catalyst particles with said impregnating solution of sufficient concentration to deposit thereon additional platinum in an amount of at least 0.2 weight percent, drying and reheating the resulting composite to reforming temperature.

References Cited in the file of this patent

UNITED STATES PATENTS 2,635,080   Appell _____ Apr. 14, 1953